United States Patent
Perri et al.

(10) Patent No.: US 9,656,528 B2
(45) Date of Patent: May 23, 2017

(54) MOTOR-VEHICLE SUSPENSION SYSTEM OF THE MACPHERSON TYPE, INCLUDING A TRANSVERSE LEAF SPRING

(71) Applicant: FCA Italy S.p.A., Turin (IT)

(72) Inventors: Eugenio Perri, Turin (IT); Bruno Martina, Turin (IT)

(73) Assignee: FCA Italy S.p.A., Turin (IT)

( * ) Notice: Subject to any disclaimer, the term of this patent is extended or adjusted under 35 U.S.C. 154(b) by 0 days.

(21) Appl. No.: 15/214,566

(22) Filed: Jul. 20, 2016

(65) Prior Publication Data

US 2017/0021686 A1   Jan. 26, 2017

(30) Foreign Application Priority Data

Jul. 23, 2015  (IT) .................. 10201537604

(51) Int. Cl.
  *B60G 11/08*  (2006.01)
  *B60G 7/00*  (2006.01)
  *B60G 15/06*  (2006.01)

(52) U.S. Cl.
  CPC .............. *B60G 11/08* (2013.01); *B60G 7/008* (2013.01); *B60G 15/068* (2013.01); *B60G 2202/114* (2013.01); *B60G 2204/121* (2013.01); *B60G 2204/129* (2013.01); *B60G 2204/15* (2013.01); *B60G 2204/41* (2013.01); *B60G 2206/7101* (2013.01)

(58) Field of Classification Search
  CPC combination set(s) only.
  See application file for complete search history.

(56) References Cited

U.S. PATENT DOCUMENTS 3,917,306 A * 11/1975 Madler .................. B60G 11/08
                                              280/104
4,313,618 A * 2/1982 Robinson ................ B60G 3/10
                                              280/124.134

(Continued)

FOREIGN PATENT DOCUMENTS

DE       1190810 B       4/1965
DE       3243434 A1      5/1984
                  (Continued)

OTHER PUBLICATIONS

Search Report dated Mar. 22, 2016, for Italian Publication IT UB20152440, 4 pages.

*Primary Examiner* — Nicole Verley
(74) *Attorney, Agent, or Firm* — Remarck Law Group PLC (57) ABSTRACT

A vehicle suspension system of the MacPherson type includes a pair of wheel supports, and two shock absorbers each having a body bolted to a corresponding wheel support with a top end connected to structure of the vehicle. A leaf spring is set transverse to a longitudinal direction of the vehicle, and has a central portion connected to the vehicle structure, and two ends connected to the respective wheel supports. The leaf spring is made of a single piece having opposite ends each having a forked shape, with two prongs made of a single piece with the leaf spring, wherein each prong is connected separately to the corresponding wheel support. The suspension system does not include other connection elements between each wheel support and the vehicle structure so that suspension components can be assembled on the leaf spring prior to installation on the vehicle structure.

11 Claims, 13 Drawing Sheets

(56) References Cited

U.S. PATENT DOCUMENTS

| | | | |
|---|---|---|---|
| 2012/0181806 A1 | 7/2012 | Worup et al. | |
| 2013/0241167 A1* | 9/2013 | Perri | B60G 11/08 280/124.134 |
| 2014/0327219 A1 | 11/2014 | Perri et al. | |
| 2014/0345958 A1* | 11/2014 | Lavarack | B60G 3/18 180/55 |
| 2015/0102575 A1* | 4/2015 | Lake | B60G 11/10 280/124.107 |
| 2016/0046162 A1 | 2/2016 | Seethaler et al. | |

FOREIGN PATENT DOCUMENTS

| | | | | |
|---|---|---|---|---|
| DE | 102010042222 A1 | | 4/2012 | |
| DE | 102013207910 A1 | | 10/2014 | |
| EP | 0685354 A1 | | 12/1995 | |
| EP | 1120298 A1 | * | 8/2001 | ............... B60G 3/10 |
| EP | 2799262 A1 | | 11/2014 | |
| FR | 2765155 A1 | | 12/1998 | |
| FR | 2958216 A1 | * | 10/2011 | ............ B60G 11/08 |
| FR | 2991918 A1 | | 12/2013 | |
| GB | 1205850 A | | 9/1970 | |
| JP | 2000255233 A | | 9/2000 | |
| WO | 2015074819 A1 | | 5/2015 | |

\* cited by examiner

MOTOR-VEHICLE SUSPENSION SYSTEM OF THE MACPHERSON TYPE, INCLUDING A TRANSVERSE LEAF SPRING

CROSS REFERENCE TO RELATED APPLICATIONS

This application claims priority to Italian Patent Application No. 102015000037604 filed on Jul. 23, 2015, the entire disclosure of which is incorporated herein by reference.

FIELD OF THE INVENTION

The present invention relates to motor-vehicle suspension systems of the MacPherson type, for example, in particular, for rear suspensions, comprising:
- a pair of wheel supports;
- two shock absorbers, each having a body bolted to a corresponding wheel support with a top end connected to the structure of the motor vehicle; and
- a leaf spring, which counters the vertical movements of the two wheel supports, is set transverse to the longitudinal direction of the motor vehicle, is connected to the structure of the motor vehicle via four elastic supports, and has two ends connected to the respective wheel supports.

PRIOR ART

A suspension system of the type referred above is, for example, described and illustrated in the document No. EP 2 799 262 A1 filed in the name of the present applicant. This known solution regards a motor-vehicle suspension system of the multi-link type, in which the leaf spring, set transverse to the longitudinal direction of the motor vehicle, is connected to an auxiliary frame of the motor vehicle by means of elastic supports set symmetrically in intermediate positions between the centre of the leaf spring and its ends. The ends of the leaf spring have a triangular configuration with a vertex towards the end of the leaf spring that is connected in an articulated way to the wheel support. The wheel supports are also connected to the auxiliary frame by means of two transverse bottom arms, one substantially longitudinal or oblique bottom arm, and at least one top transverse arm.

A further suspension system of the type referred above is, for example, described and illustrated in the document JP 2000 255233 A.

Object of the Invention

The main object of the present invention is to provide a suspension system of the type referred to at the start of the present description that will be simple and inexpensive to produce, and strong and reliable.

A further object of the present invention is to provide a suspension system of the type referred to at the start of the present description that will reduce the number of components used as compared to suspension systems according to the prior art, and that will hence be light and present a low cost.

Yet a further object of the present invention is to achieve the aforesaid targets with a suspension system that will enable elimination of the use of an auxiliary frame, with consequent saving in weight, without thereby forgoing the possibility of mounting the entire suspension on the structure of the motor vehicle after prior assembly of the components of the suspension together.

SUMMARY OF THE INVENTION

With a view to achieving the aforesaid objects, the subject of the present invention is a suspension system having the characteristics referred to at the start of the present description and moreover characterized in that:
- said leaf spring is made of a single piece having opposite ends each having a forked shape, with two prongs made of a single piece with said leaf spring, wherein each prong is connected separately to the corresponding wheel support by means of an elastic support or a ball joint; and
- said suspension system does not comprise other connection elements between each wheel support and the structure of the motor vehicle so that said transverse leaf spring can be used also as auxiliary frame on which the components of the suspension can be assembled prior to installation on the structure of the motor vehicle.

Thanks to the above characteristics, the conformation of the leaf spring according to the invention guarantees adequate stiffness in regard to pitch, roll, and wheel micromovements defined by the kinematic behaviour of the suspension, without making use of any further element for connection to the structure of the motor vehicle, and without making use of the auxiliary frame for pre-assembly of the suspension, the function of which is likewise performed by the leaf spring.

Moreover, the suspension system according to the invention preserves all the advantages of a suspension system according to the known art, guaranteeing the vertical elastic thrust and hence without any need to use conventional helical springs with the corresponding resting cups.

The leaf spring of the suspension system according to the invention thus integrates multiple elastic and structural functions and is constituted by a single piece preferably made of composite material in which the two prongs of each end of the leaf spring are comprised, hence being advantageous from the standpoint of reduction of the overall weight of the suspension system and at the same time sufficiently sturdy to withstand the loads acting on the suspension following upon movement of the motor vehicle on which the suspension system is mounted.

According to an important characteristic of the invention, the two prongs of each end of the leaf spring have a different width (in the horizontal direction transverse to the longitudinal direction of the leaf spring) and/or thickness (i.e., in the vertical direction).

According to a further characteristic, each of the two prongs of each end of the leaf spring is connected to the corresponding wheel support by means of an elastic support in the form of a bushing or by means of a ball joint, so that for both of the prongs two bushings or two ball joints could be provided. In the preferred embodiment, however, each end of the leaf spring has one prong provided with an elastic bushing and the other prong provided with a ball joint.

Moreover, thanks to the forked shape of the ends of the leaf spring according to the invention, there is envisaged passage of each shock absorber through the gap defined between the two prongs of the respective end of the leaf spring. Consequently, the shock absorber can be set in a relatively lower position, with substantial advantages from the standpoint of the internal liveability of the motor vehicle, thanks to the positioning further down of the connections of the top ends of the shock absorbers to the structure of the motor vehicle.

Once again in the case of the preferred embodiment, the leaf spring comprises two intermediate portions of enlarged thickness in an area adjacent to the ends of the central portion of the leaf spring, each having two seats for two of said elastic supports connected to the structure of the motor vehicle. The two pairs of the aforesaid seats are arranged symmetrically with respect to the centre of the leaf spring, and the two seats of each intermediate portion are aligned to one another according to the longitudinal direction of the motor vehicle.

Yet a further characteristic of the invention lies in the fact that the leaf spring has a width in the longitudinal direction of the motor vehicle that is maximum at the intermediate portions of enlarged thickness and in the fact that the ends of the leaf spring have a tapered shape with a width in the longitudinal direction of the motor vehicle that decreases towards the wheel supports.

The subject of the present invention is also a method for assembly of the suspension system having the characteristics indicated above, characterized in that the components of the suspension are assembled on the leaf spring prior to installation on the structure of the motor vehicle.

The suspension system according to the invention is moreover compatible with installation under the body of the motor vehicle in a position corresponding to the compartment that is to receive the spare wheel.

DETAILED DESCRIPTION OF A PREFERRED EMBODIMENT

Further characteristics and advantages of the invention will emerge from the ensuing description with reference to the annexed drawings, which are provided purely by way of non-limiting example and in which.

In FIGS. 1-5, the reference number 1 designates as a whole a preferred embodiment of a rear suspension system of the MacPherson type according to the invention. The arrow A indicates the direction of advance of the motor vehicle. The suspension system 1 comprises for each wheel a pseudo-vertical shock absorber 2 bolted to a corresponding wheel support 3. According to a known constructional scheme, the shock absorbers 2 are each constrained in their top part by means of an elastic block 18 to a top wheel housing belonging to the structure of the motor vehicle.

As illustrated in FIGS. 1-5, the shock absorber 2 comprises a cylindrical body 16 slidable inside which is a stem 17. The cylindrical body 16 of the shock absorber 2 is bolted to the respective wheel support 3 by means of two screws 20 that connect a bracket 19 coupled with the shock absorber 2 to the wheel support 3.

Once again with reference to FIGS. 1-5, each of the wheel supports 3 is connected to a leaf spring 4 that extends along an axis transverse with respect to the vehicle underneath the body. The leaf spring 4 is preferably constituted by a single piece of composite material, including a matrix of plastic material reinforced with fibres, for example carbon fibres or glass fibres.

The leaf spring 4 has a central portion 5 and two end portions 6. In order to provide a suspension system that achieves the pre-established targets of the present invention, each end portion 6 of the leaf spring 4 has a forked shape, with two prongs 7, 70 made of a single piece with the leaf spring 4. The leaf spring has a geometry that is symmetrical with respect to a longitudinal median plane, so that the two pairs of end prongs define two rear prongs 7 and two front prongs 70 symmetrical to one another. The two rear prongs 7 are connected to the wheel supports 3 by means of two ball joints E1, whereas the two front prongs 70 are connected to the wheel supports by means of two elastic supports E2.

Figure 4:
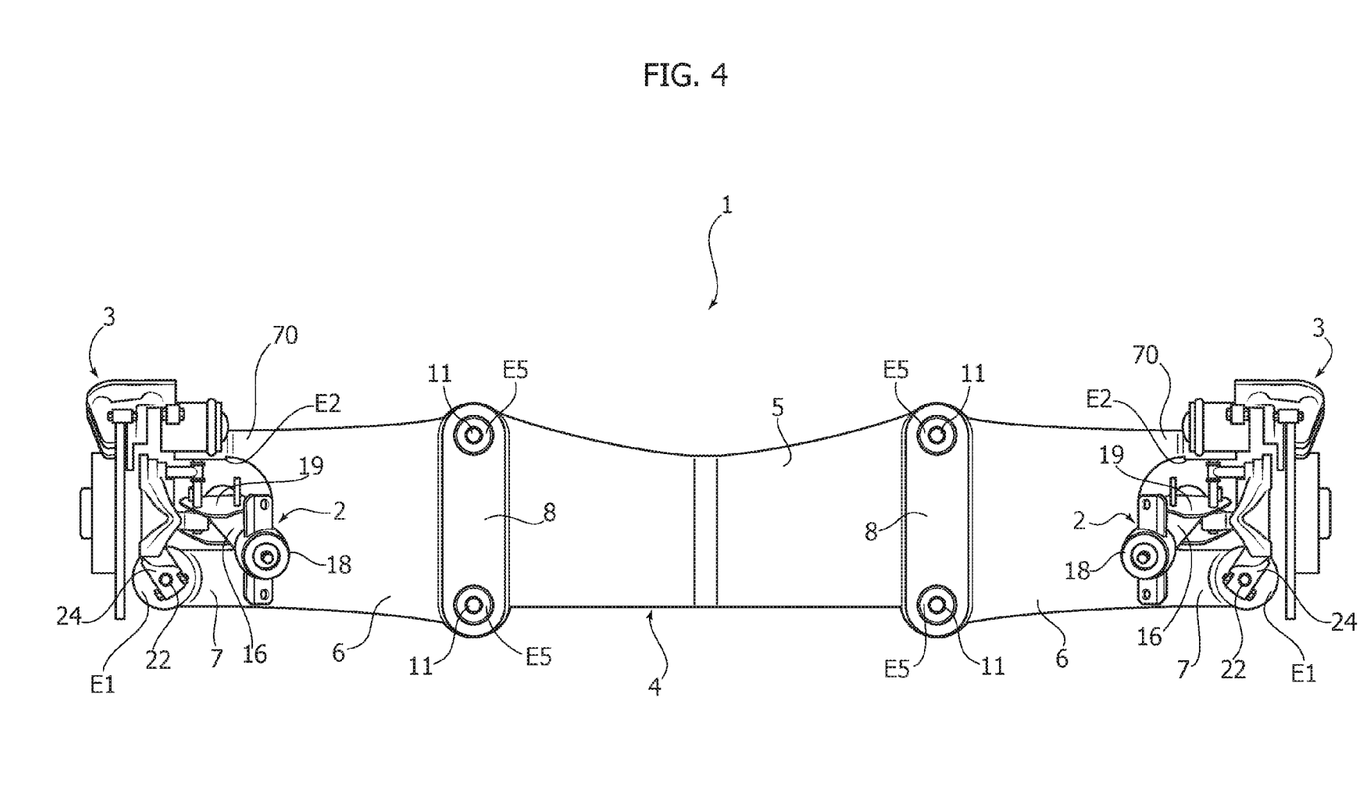
FIGS. 4 and 5 are, respectively, a top plan view and a front view of the suspension system of the previous figures.
Figure 5:
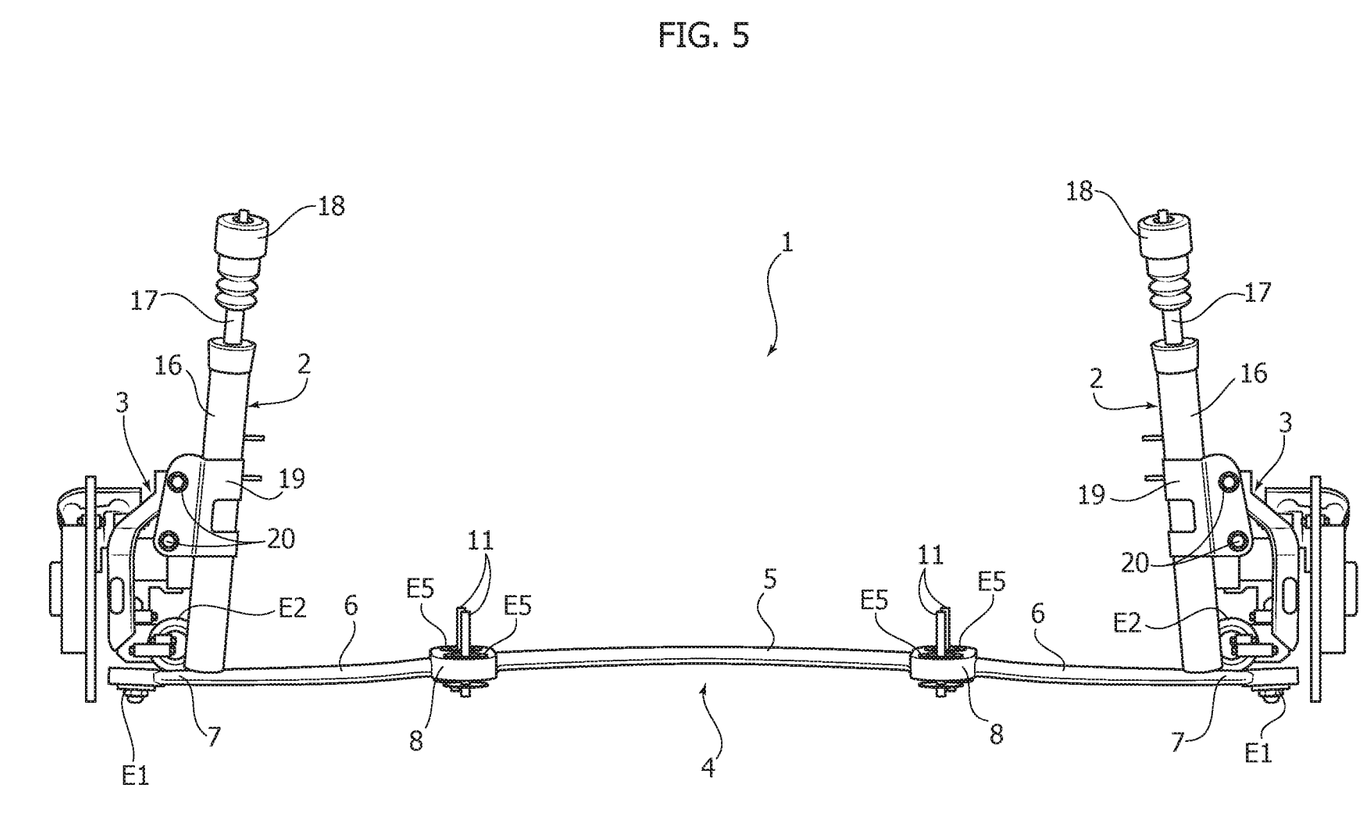

According to an important characteristic of the present invention, the two prongs 7, 70 of each end of the leaf spring 4 have a different width (FIG. 4). Thanks to this characteristic the conformation of the leaf spring guarantees adequate stiffness in regard to pitch, roll, and wheel micromovements defined by the kinematic behaviour of the suspension.

In an alternative embodiment (not illustrated in the drawings), the two prongs of each end have a thickness different from one another.

By the expression "width of the prongs" is meant the dimension of the prongs in a horizontal direction transverse to the longitudinal direction of the leaf spring, whereas by the term "thickness" is meant the dimension of the prongs in a vertical direction.

In the specific non-limiting example illustrated herein, moreover, the leaf spring 4 comprises two intermediate portions 8 in an area adjacent to the ends of the central portion 5. The intermediate portions 8 of the leaf spring 4 each have two seats for two elastic supports E5 connected to the structure of the motor vehicle. The two pairs of seats of the elastic supports E5 connected to the structure of the motor vehicle, in this example, are arranged symmetrically with respect to the centre of the leaf spring 4, the two seats of each intermediate portion 8 being aligned to one another according to the longitudinal direction of the motor vehicle. The intermediate portions 8 that connect each pair of elastic supports E5 have an enlarged thickness as compared to the end portions 6 of the leaf spring 4 in order to withstand in an optimal way the constraint loads of the elastic supports E5 distributed throughout the width of the leaf spring 4.

With reference in particular to FIG. 4, the leaf spring 4 has a width in the longitudinal direction of the motor vehicle that is maximum at the intermediate portions of enlarged thickness 8, whereas the end portions 6 of the leaf spring 4 have a shape slightly tapered with a width in the longitudinal direction of the motor vehicle that decreases towards the wheel supports 3.

The configuration described above of the leaf spring 4 enables it to fulfil the functions both of kinematic guide and of elastic element for vertical control of the wheels during vertical shaking, thus integrating multiple elastic and structural functions of a suspension system according to the known art.

Figure 3:
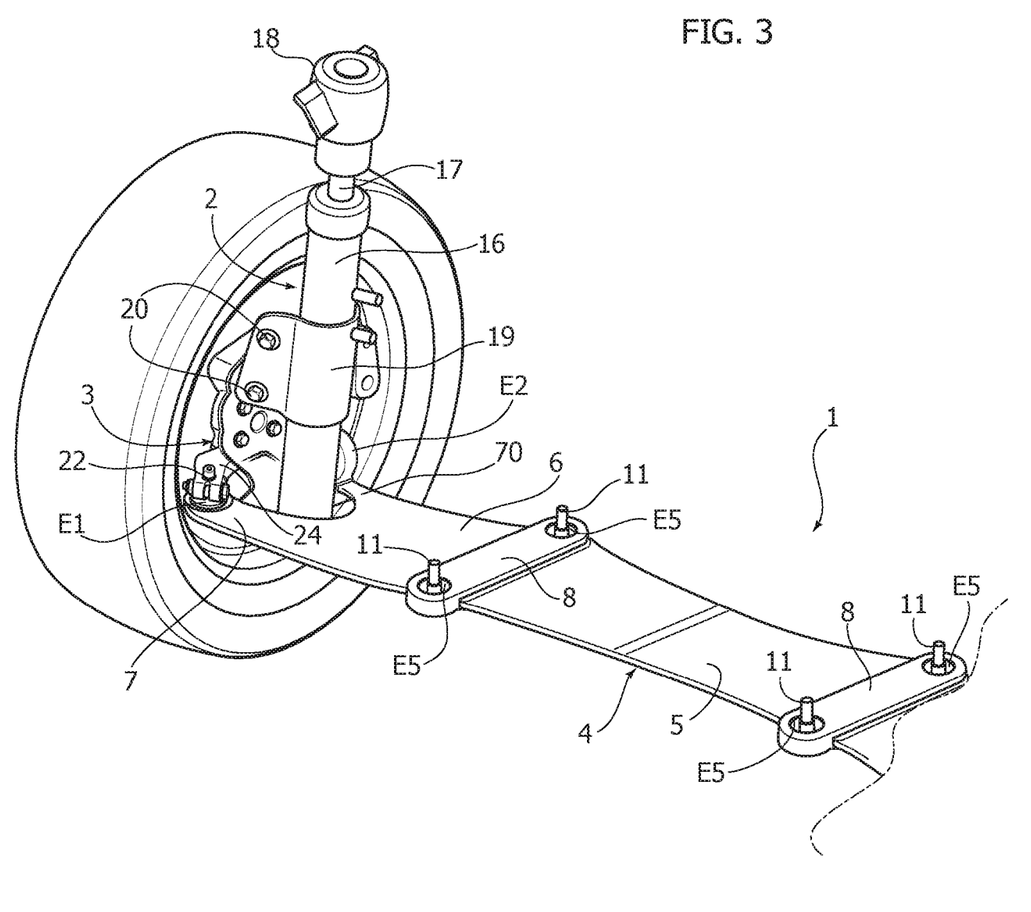
FIG. 3 is a partial perspective view of the suspension system of FIG. 1.

In addition, as is clearly visible in FIG. 3, the geometry of the end portions 6 of the leaf spring 4 also enables a relatively lower position of the shock absorber 2, with substantial advantages from the standpoint of internal liveability of the motor vehicle, thanks to the lower positioning of the connections of the top ends of the shock absorbers 2 to the structure of the motor vehicle. This positioning is enabled by the fact that each shock absorber 2 is set in the gap between the two prongs 7, 70 of the corresponding ends of the leaf spring 4.

As may be seen in particular in FIGS. 4-7, the four elastic supports E5 connected to the structure of the motor vehicle are bushings with vertical axis each inserted in the respective seat present on the intermediate portions 8 of the leaf spring 4.

Figure 6:
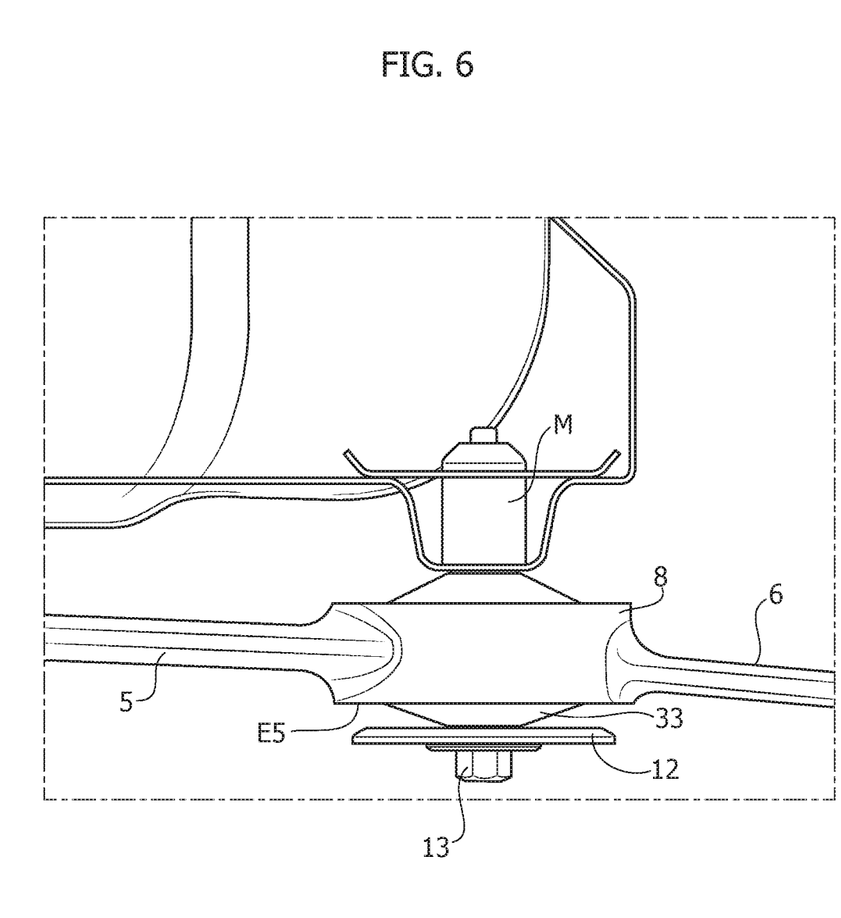
FIG. 6 is a front view of an element for connection of the suspension system of FIG. 1 to the structure of the motor vehicle.
Figure 7:
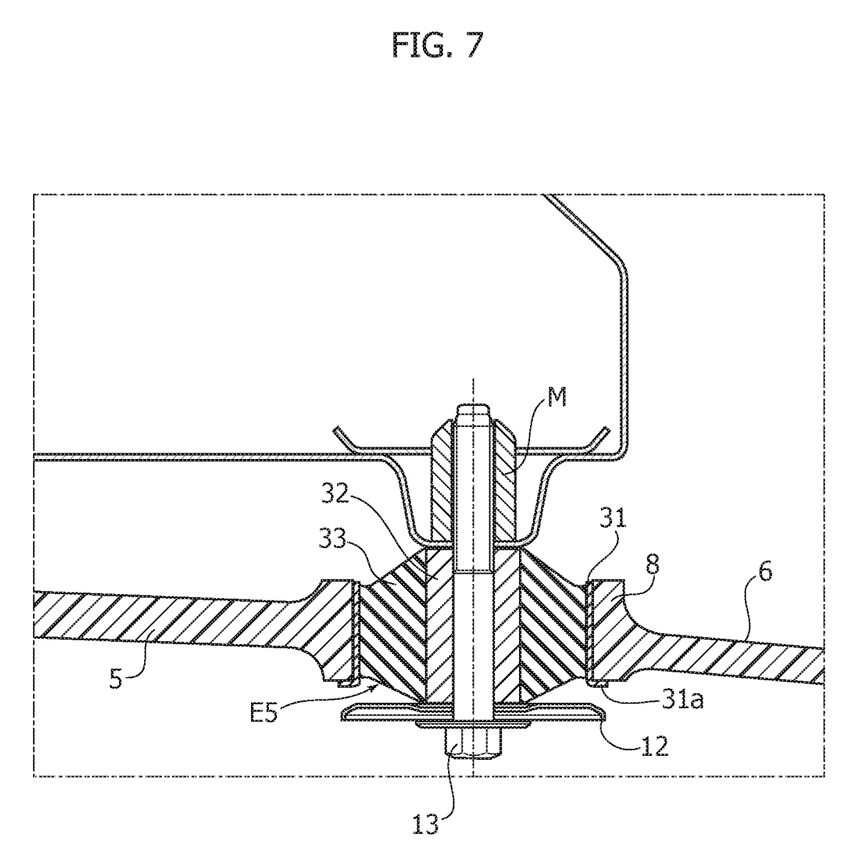
FIG. 7 is a cross-sectional view of the detail indicated by the arrow VII in FIG. 2.

The bushings with vertical axis, as illustrated in the cross-sectional view of FIG. 7 and in the front view of FIG. 6, each comprise an annular body 33 made of elastomeric material set between an external metal reinforcement 31 of a cylindrical shape and an internal metal reinforcement 32, which also has a tubular cylindrical shape. The external reinforcement 31 is inserted with a precise fit into the respective seat of the intermediate portion 8 of the leaf spring 4 until an annular flange 31*a* thereof comes to bear upon the bottom surface of the portion 8 of the leaf spring 4. For reasons of stability of the fit, a layer of adhesive is set in the cylindrical wall between the external metal reinforcement 31 of the bushing with vertical axis and the respective seat of the intermediate portion 8 of the leaf spring 4.

Moreover, once again with reference to FIG. 7, the internal tubular reinforcement 32 is secured to the structure of the motor vehicle via a screw 11 and an internal screw M integrated in the structure of the motor vehicle. An end-of-travel washer 12 is associated to the head 13 of the screw 11 so as to prevent it from accidentally sliding out of the leaf spring 4 following upon possible breaking of the annular body 33 of the elastic support E5.

Figure 1:
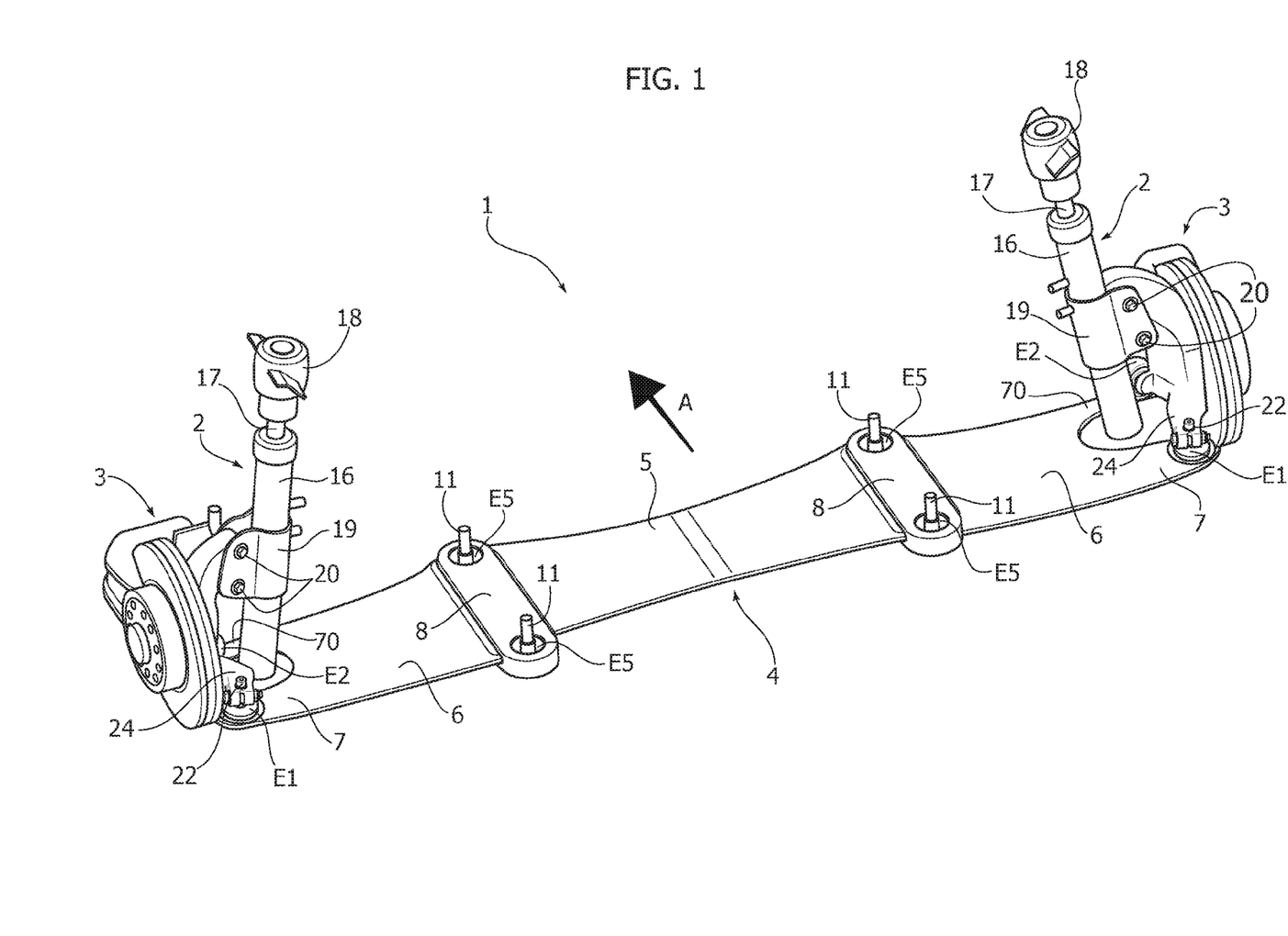
FIG. 1 is a perspective view of a preferred embodiment of a rear motor-vehicle suspension system of the MacPherson type according to the present invention.
Figure 2:
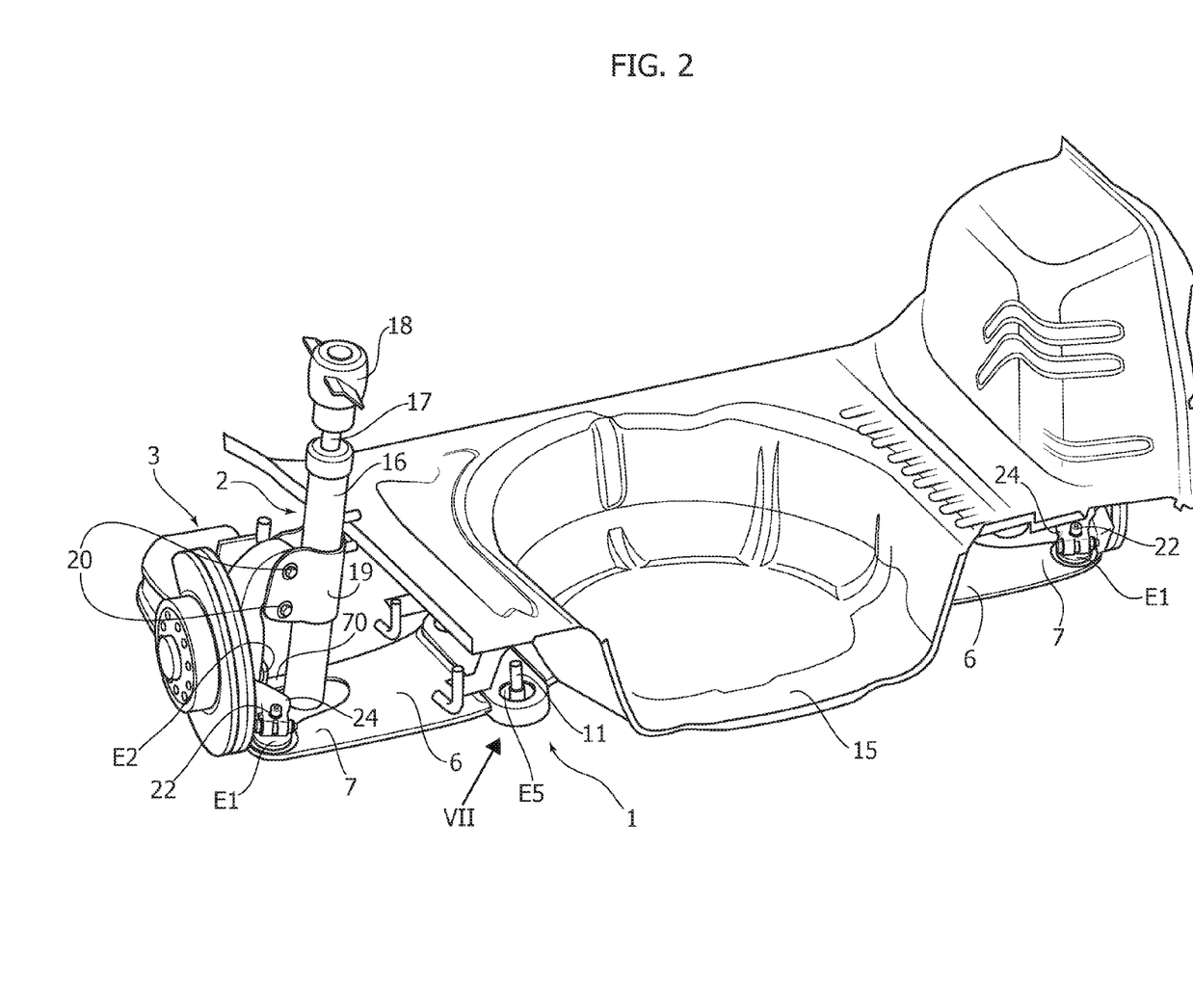
FIG. 2 is a further perspective view of the suspension system of FIG. 1 associated to a portion of a structure of motor vehicle.

As illustrated in FIG. 2, the four elastic supports E5 are connected to the structure of the motor vehicle in the proximity of the compartment 15 for a spare wheel, and an additional characteristic of the suspension system 1 is that of maintaining compatibility with the compartment 15 for the spare wheel.

Figure 8:
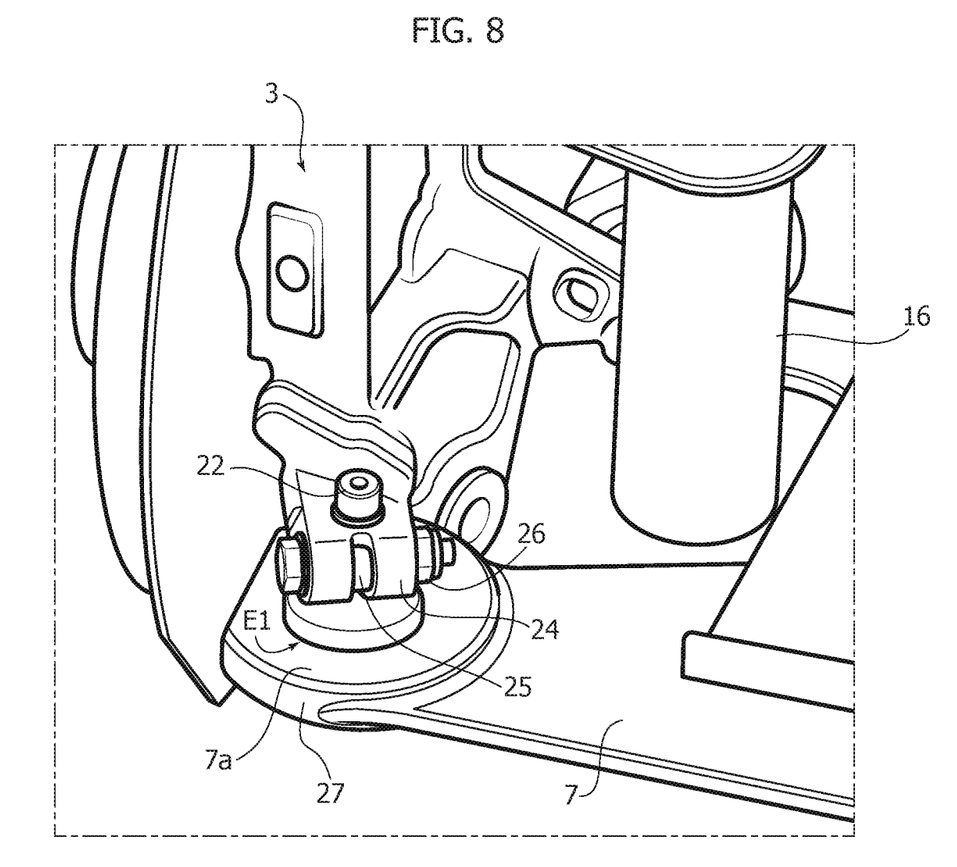
FIGS. 8 and 9 are, respectively, a perspective view and a top plan view of a ball joint that connects a prong of the leaf spring of the suspension of the previous figures to the corresponding wheel support.

With reference to FIGS. 8-13, at least one of the two prongs 7, 70 of each end of the leaf spring 4 can be connected to the corresponding wheel support 3 by means of an elastic support E2 in the form of a bushing with axis parallel to the longitudinal direction of the motor vehicle (FIG. 11), or else by means of a ball joint E1 (FIG. 8).

Figure 9:
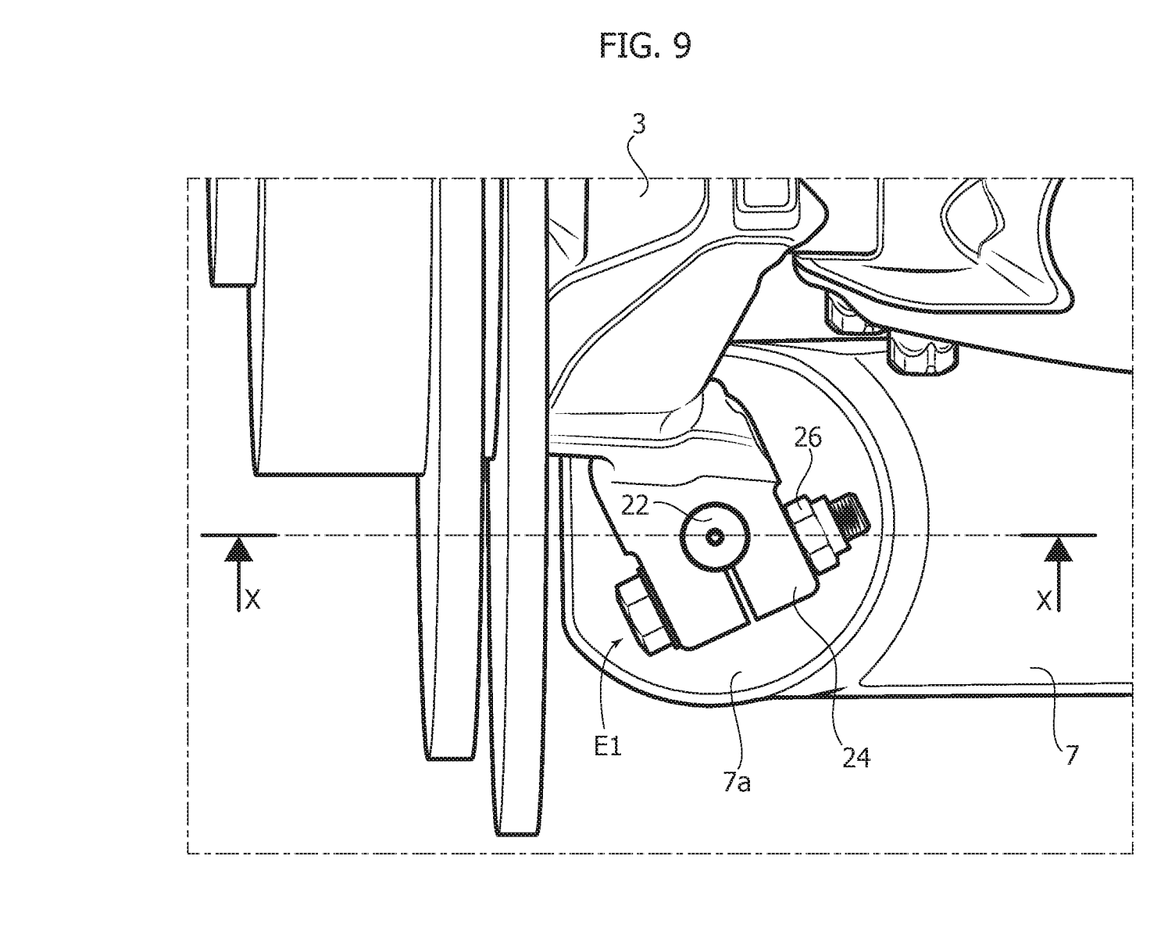
Figure 10:
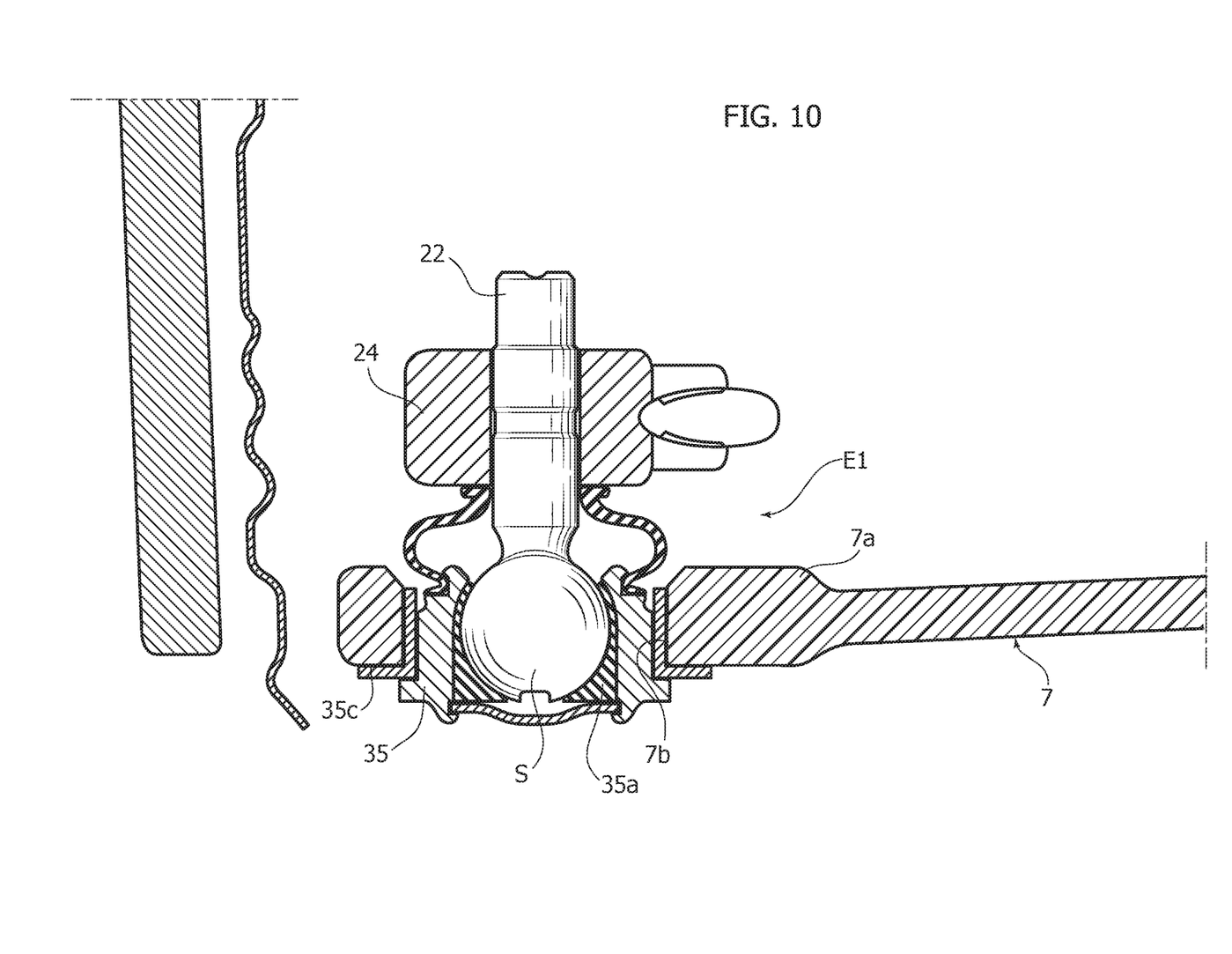
FIG. 10 is a cross-sectional view according to the line X-X of FIG. 9.

FIGS. 8-10 illustrate in detail a ball joint E1 of the preferred embodiment. In the example illustrated, the ball joint E1 includes a spherical head S carried by a pin 22 with vertical axis. The spherical head S is received within an external cylindrical metal reinforcement 35 with interposition of a cap 35*a* of synthetic material. The external reinforcement 35 is inserted in a cylindrical through opening 7*b* made within a disk-shaped portion 7*a* rigidly connected to the end of the prong 7. The external cylindrical reinforcement 35 is inserted in the opening 7*b* with interposition of a bushing 35*c* having an end flange that defines assembly end-of-travel. The bushing 35*c* is glued to the cylindrical wall of the opening 7*b*. The pin 22 with vertical axis is blocked on the wheel upright 3 by means of a clamp 24 fastened by a bolt 25 and a nut 26.

Figure 11:
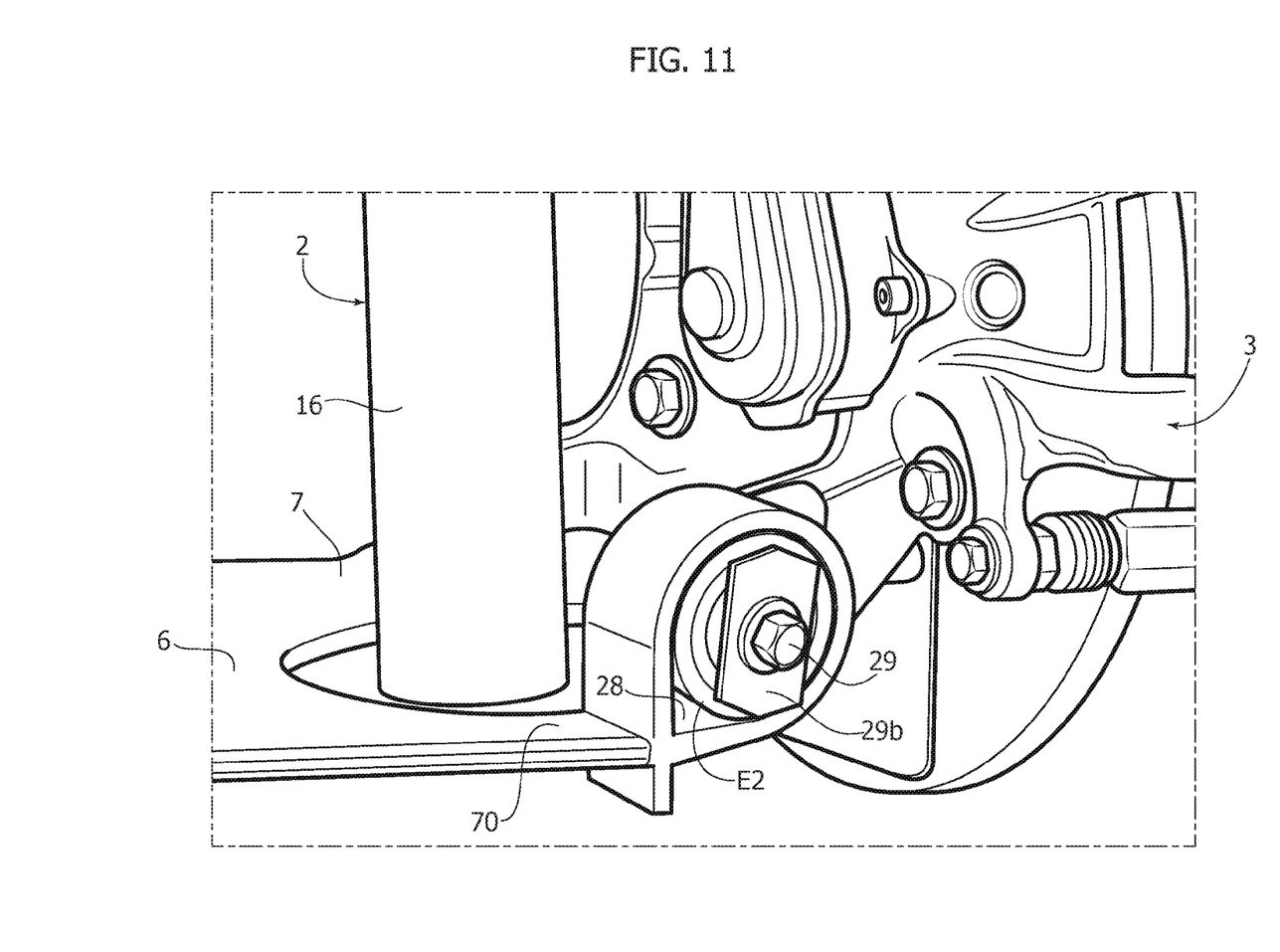
FIGS. 11 and 12 are two different perspective views of an elastic support that connects a prong of the leaf spring of the suspension of the previous figures to the corresponding wheel support.
Figure 12:
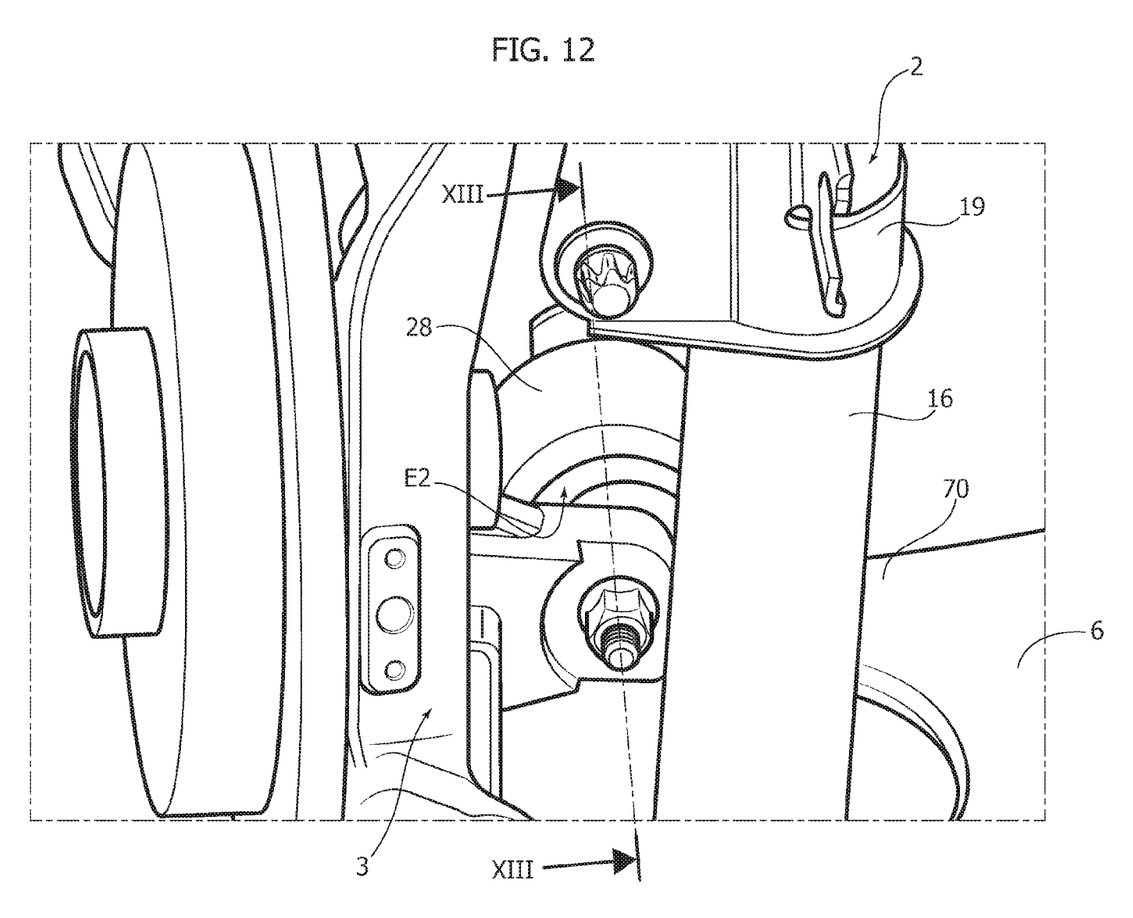
Figure 13:
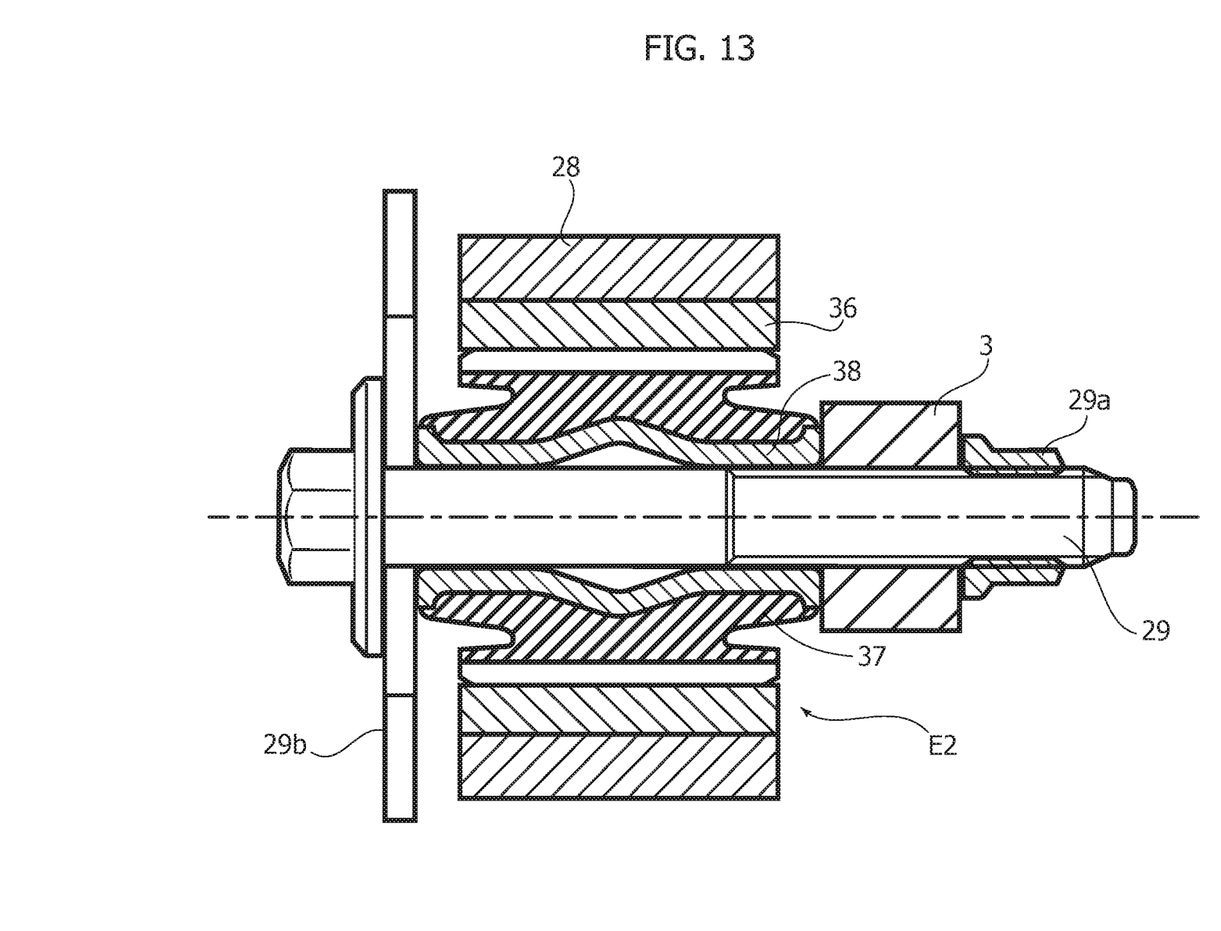
FIG. 13 is a cross-sectional view according to the line XIII-XIII of FIG. 12.

Illustrated in perspective view in FIGS. 11-13 is the detail of the preferred embodiment. In this case, the two front prongs 70 are connected to the respective wheel support 3 by means of two elastic supports E2 that have a bushing conformation with axis parallel to the longitudinal direction of the motor vehicle 3. As visible in particular in the cross-sectional view of FIG. 13, the bushing comprises a tubular body 37 made of elastomeric material set between an external cylindrical metal reinforcement 36 and an internal cylindrical metal reinforcement 38. The external reinforcement 36 is inserted with precise fit in an eye 28 of the prong 70 obtained by local deformation of the prong 70. The internal tubular reinforcement 38 of the elastic support E2 is fixed by means of a bolt 29 and a nut 29*a* to the wheel support 3. Associated to the bolt 29 is a safety plate 29*b* designed to prevent accidental decoupling of the leaf spring 4 from the support 3 following upon possible failure of the body made of elastomeric material 37.

In an alternative embodiment (not illustrated herein) the eye 28 may be an element separate from the prong 70, which is screwed at the end of the prong 70.

As illustrated in FIGS. 1-13, the leaf spring 4 has a configuration such that the components of the suspension system 1 are assembled on the leaf spring 4 prior to installation on the structure of the motor vehicle. In this way, it is not necessary to use an auxiliary frame according to the constructional scheme of the prior art.

Consequently, the present invention is also aimed at the method for assembly of the suspension system 1 described above, characterized in that the components of the suspension are assembled on said leaf spring 4 prior to installation on the structure of the motor vehicle.

Moreover, taking into account that the leaf spring 4 has been designed to be made of a single piece of composite material comprising the prongs 7, 70, there is a consequent clear reduction in weights and costs of the suspension system 1 and an increase in stiffness for withstanding the loads acting on the suspension system 1.

Of course, without prejudice to the principle of the invention, the details of construction and the embodiments may vary widely with respect to what has been described and illustrated purely by way of example herein, without thereby departing from the scope of the present invention.

What is claimed is:

1. A motor-vehicle suspension system of the MacPherson type comprising:
   a pair of wheel supports;
   two shock absorbers each having a body bolted to a corresponding wheel support with a top end connected to a structure of the motor vehicle; and
   a leaf spring, which counters vertical movements of the wheel supports, is set transverse to a longitudinal direction of the motor vehicle, is connected to the structure of the motor vehicle via four elastic supports, and has two ends connected to the respective wheel supports,
   said suspension system being characterized in that:
   said leaf spring is made of a single piece having opposite ends each having a forked shape, with two prongs made of a single piece with said leaf spring, wherein each prong is connected separately to the corresponding wheel support by an elastic support or a ball joint; and said suspension system does not comprise other connection elements between each wheel support and the structure of the motor vehicle so that said transverse leaf spring is used also as an auxiliary frame on which components of the suspension can be assembled prior to installation on the structure of the motor vehicle.

2. The motor-vehicle suspension system of the MacPherson type according to claim 1, wherein the two prongs of each end of the leaf spring have a width and/or thickness different from one another.

3. The motor-vehicle suspension system of the MacPherson type according to claim 1, wherein said leaf spring is made of composite material and has a central portion connected to the structure of the motor vehicle by four elastic supports.

4. The motor-vehicle suspension system of the MacPherson type according to claim 1, wherein at least one of the two prongs of each end of the leaf spring is connected to the corresponding wheel support by an elastic support in the form of a bushing with an axis parallel to the longitudinal direction of the motor vehicle, having an external cylindrical reinforcement inserted in a metal terminal connected to the leaf spring.

5. The motor-vehicle suspension system of the MacPherson type according to claim 1, wherein at least one of the two prongs of each end of the leaf spring is connected to the corresponding wheel support by a ball joint having an external cylindrical reinforcement inserted in a seat of the leaf spring.

6. The motor-vehicle suspension system of the MacPherson type according to claim 1, wherein one of the two prongs of each end of the leaf spring is connected to the corresponding wheel support by an elastic support in the form of a bushing with an axis parallel to the longitudinal direction of the motor vehicle, having an external cylindrical reinforcement inserted in a metal terminal connected to the leaf spring, and the other prong of each end of the leaf spring is connected to the corresponding wheel support by a ball joint having an external cylindrical reinforcement inserted in a seat of the leaf spring.

7. The motor-vehicle suspension system of the MacPherson type according to claim 1, wherein said shock absorber is set through a gap between the two prongs of the respective ends of the leaf spring.

8. The motor-vehicle suspension system of the MacPherson type according to claim 3, wherein said leaf spring comprises two intermediate portions of enlarged thickness in an area adjacent to ends of the central portion of the leaf spring, each having two seats for two of said elastic supports connected to the structure of the motor vehicle, the two seats of each intermediate portion being arranged symmetrically with respect to the centre of the leaf spring, and the two seats of each intermediate portion being aligned to one another according to the longitudinal direction of the motor vehicle.

9. The motor-vehicle suspension system of the MacPherson type according to claim 8, wherein said elastic supports are bushings with vertical axis, each inserted in the respective seat and each connected to the structure of the motor vehicle by a fixing screw.

10. The motor-vehicle suspension system of the MacPherson type according to claim 9, wherein said leaf spring has a width in the longitudinal direction of the motor vehicle that is a maximum at said intermediate portions of enlarged thickness and wherein the end portions of the leaf spring have a tapered shape with a width in the longitudinal direction of the motor vehicle that decreases towards the wheel supports.

11. A method for assembly of a suspension system according to claim 1, wherein components of the suspension are assembled on said leaf spring prior to installation on the structure of the motor vehicle.

* * * * *